US012661653B2

(12) United States Patent
Webber et al.

(10) Patent No.: US 12,661,653 B2
(45) Date of Patent: Jun. 23, 2026

(54) PRE-IDENTIFIED CONSUMABLES FOR TISSUE PROCESSING AND METHOD

(71) Applicant: CellPath Ltd, Newtown (GB)

(72) Inventors: Paul Webber, Newtown (GB); Philip Webber, Newtown (GB); Richard Titcombe, Newtown (GB); Neil Haine, Newtown (GB)

(73) Assignee: CellPath Ltd, Newtown (GB)

( * ) Notice: Subject to any disclaimer, the term of this patent is extended or adjusted under 35 U.S.C. 154(b) by 0 days.

(21) Appl. No.: 18/720,090

(22) PCT Filed: Dec. 19, 2022

(86) PCT No.: PCT/EP2022/086555
§ 371 (c)(1),
(2) Date: Jun. 14, 2024

(87) PCT Pub. No.: WO2023/111347
PCT Pub. Date: Jun. 22, 2023

(65) Prior Publication Data
US 2025/0058325 A1 Feb. 20, 2025

(30) Foreign Application Priority Data

Dec. 17, 2021 (GB) ...................................... 2118467

(51) Int. Cl.
*G01N 1/36* (2006.01)
*B01L 3/00* (2006.01)

(52) U.S. Cl.
CPC ................ *B01L 3/545* (2013.01); *G01N 1/36* (2013.01); *B01L 2300/021* (2013.01); *B01L 2300/022* (2013.01)

(58) Field of Classification Search
CPC ............. B01L 3/545; G01N 1/36; G06K 7/00
(Continued)

(56) References Cited

U.S. PATENT DOCUMENTS 3,674,396 A 7/1972 Mccormick
11,833,518 B2 * 12/2023 Widly ................ A61B 10/0096
(Continued)

FOREIGN PATENT DOCUMENTS

EP 1445021 A1 8/2004
EP 2951672 B1 12/2015
(Continued)

OTHER PUBLICATIONS

Combined Search and Examination Report under Section 17 18(3) of the UK Intellectual Property Office mailed Jun. 23, 2022, for GB Application No. 2118467.6.
(Continued)

*Primary Examiner* — Edwyn Labaze
(74) *Attorney, Agent, or Firm* — Cook Alex Ltd.

(57) ABSTRACT

A uniquely identifiable consumable product for use in a histology or cellular pathology process for processing a biological sample from a source, the consumable product having a unique identifier which is not linked to the source of the sample is provided. By applying a unique identifier to cassettes and other consumable products prior to use, laboratory printers for printing identification information on tissue processing cassettes and on microscope slides and the like are redundant. The unique identifier is then linked to information relating to the sample to be analysed and its source. The physical process of applying a unique identifier to the consumables prior to use enables the decoupling of the physical printing of the consumable from information relating to the source of the sample obviates the need for provision of a printing capability for consumables in laboratories.

9 Claims, 2 Drawing Sheets

(58) Field of Classification Search
USPC ................................. 235/454, 439, 435, 375
See application file for complete search history.

(56) References Cited

U.S. PATENT DOCUMENTS

| | | |
|---|---|---|
| 2003/0039590 A1 | 2/2003 | Lodge |
| 2010/0209298 A1 | 8/2010 | Kalra |
| 2011/0207169 A1 | 8/2011 | Markin |
| 2014/0258165 A1 | 9/2014 | Heil |
| 2016/0131672 A1 | 5/2016 | Tieman |
| 2018/0174670 A1* | 6/2018 | Vom ........................ G16H 10/65 |
| 2018/0257080 A1 | 9/2018 | Jordan Navas |
| 2019/0317116 A1 | 10/2019 | Phelan |
| 2020/0088613 A1* | 3/2020 | Angros .................... G01N 1/30 |
| 2020/0102595 A1* | 4/2020 | Shin ........................ G16B 20/00 |
| 2021/0190668 A1 | 6/2021 | Kovacs |

FOREIGN PATENT DOCUMENTS

| | | |
|---|---|---|
| EP | 3220833 A1 | 9/2017 |
| EP | 3981511 A1 | 4/2022 |
| EP | 4024276 A1 | 7/2022 |
| GB | 1230913 A | 5/1971 |
| WO | 2004001389 A1 | 12/2003 |
| WO | 2011144982 A1 | 11/2011 |
| WO | 2015181367 A1 | 12/2015 |
| WO | 2017157784 A1 | 9/2017 |
| WO | 2018129222 A1 | 7/2018 |
| WO | 2019153035 A1 | 8/2019 |
| WO | 2020243074 A1 | 12/2020 |
| WO | 2022207847 A1 | 10/2022 |

OTHER PUBLICATIONS

Eppendorf SafeCode System and associated consumables. https://www.eppendorf.com/in-en/certificates/safeCode. date accessed Sep. 12, 2024.
Search Report under Section 17 of the UK Intellectual Property Office of Jun. 21, 2023, for GB Application No. 2219139.9.
The International Search Report and Written Opinion mailed on Jun. 7, 2023, for International Application No. PCT/EP2022/086555.
Search Report under Section 17 of the UK Intellectual Property Office of Jun. 22, 2022, for GB Application No. 2118467.6.

* cited by examiner

PRE-IDENTIFIED CONSUMABLES FOR TISSUE PROCESSING AND METHOD

CROSS-REFERENCE TO RELATED APPLICATIONS

This is a U.S. National Stage of International PCT Application No. PCT/EP2022/086555, filed Dec. 19, 2022, which claims the benefit of and priority to Great Britain Application No. 2118467.6, filed Dec. 17, 2021, the disclosures of which are hereby incorporated by reference in their entireties.

This invention relates to pre-identified laboratory consumables for use in tissue processing and a method of processing tissue using pre-identified consumables, particularly sample/transport pots, histology processing cassettes and microscope slides.

Biological materials for histological examination are processed in large quantities for a wide range of diagnostic purposes. It is essential to ensure that tissue samples remain uniquely identified with the source of the tissue for technical, medical, ethical and legal reasons. Typically, the tissue is obtained from its source, which may be a patient or from a stored sample, the tissue is then placed in a sample/transport pot or vial and typically transported or mailed to a location for tissue processing.

Tissue processing conventionally involves placing the sample into a histology processing cassette and treating with processing solutions or fluids depending on the nature of the sample to dehydrate or otherwise treat the tissue sample. The treated tissue sample is then embedded in paraffin wax or other embedding media and cooled to provide the sample in a rigid form suitable for thinly slicing the embedded sample using a microtome to provide a section of the sample suitable for analysis. The sample section is typically subjected to further handling processes and stained, mounted on a slide and subjected to microscopic analysis. Results are then reported and the sample section archived which may be onsite or offsite. The sample may be taken directly from a subject for analysis or may be from a library or archive, for example a database, of stored samples. Throughout the process, from taking the sample from a subject or other source through sample transport, preparation and analysis, to sample storage, information about the source of the tissue sample must remain associated with the sample so as to be able to uniquely identify the sample and its source at any point in the process.

During this process, the sample is transferred from the sample pot, to the cassette for sample processing and microtomy and then to the sample slide for analysis. These items are supplied in bulk in large quantities. Each of these items must be marked with the identifier which links the sample to the source of the sample and, typically, a large number of samples, for example 50 or more are processed together and must be marked accordingly.

In a typical process, a sample is taken in a clinic, a patient information label including patient details is printed, attached to the sample pot and a form identifying the patient and linking the patient to the sample. The pot and associated form, both duly labelled, are then sent to a laboratory for further processing. The sample is entered into the laboratory booking/tracing system and a request number is generated and printed and applied to the sample pot. The request number correlates with the patient information label and maintains the link to the origin of the sample. A histology processing cassette (or multiple cassettes) is then printed, typically with the request number and a newly-generated cassette number. The cassette is then processed and embedded in wax and subjected to microtomy where a number of slices of the sample are produced and each applied to a different sample slide. Each sample slide is printed with identifier details such as the request number, cassette number and a slide number. For any given sample, a number of slides are typically produced and different slides of the same sample may be separated for separate processing. Upon completion of processing, the request form, sample pot, cassette blocks and sample slides are manually sorted and collated for each sample diagnosis is then performed.

Generation of these of labels and/or printing of the cassettes and sample slides at the point of use with information available only at that time involves printing the consumable, for example the cassette, sample pot and sample slide, with a unique identifier using dedicated printers. Such dedicated, specialist printing apparatus is costly and printing is typically carried out by trained technicians. Furthermore, laboratories must provide bench space for such apparatus. Conventional processes accordingly involve significant capital expenditure, operating costs including consumables in the printers, delay in processing throughput due to the need to label at least three items of equipment for each sample at the point of use.

In known processes, labelling and printing of the various consumable items used in a histological sample collection and processing with information relating to the patient or other tracking information directly correlated with that information during the process is essential in order to track the sample and to ensure the accurate identification of its origin. Moreover, the necessity of having the consumable and the accompanying sample directly linked to the subject or origin of the sample through labelling applied during the process has been dependent on knowing the identity of the subject or origin thereby requiring the consumables to be labelled and thereby identifiable during the process with the attendant drawbacks referred to above.

We have now devised tissue analysis consumable products and a method of processing tissue samples which avoids or ameliorates these drawbacks by recognising, counter-intuitively, that information relating to the subject or origin of the sample and the application of a unique identifier may be dissociated. The invention runs contrary to the conventional approach of labelling of the consumable product creates the connection between the sample in the consumable and the origin of the sample. The invention resides in understanding that physical application of a unique identifier to the consumable may be carried out separately of application to the consumables of information or an identifier relating to or connected to the source of the sample.

In a first aspect, the invention relates to a uniquely identifiable consumable product for use in a histology or cellular pathology process for processing a biological sample from a source, the consumable product comprising a unique identifier which is not linked to the sample or the source of the sample.

In a second aspect, the invention relates to a uniquely identifiable consumable product for use in a histology or cellular pathology process for processing a biological sample from a source, the consumable product being pre-identified with a unique identifier which is not related to the sample or the source of the sample.

Reference to the unique identifier not being related to or linked to the source of the sample refers to the unique identifier at the point at which the consumable product is manufactured and the unique identifier applied to the consumable product and up to the point at which the consumable product is used. At that time, a sample will be placed in, on or otherwise associated with the consumable product and information relating to the sample will be linked to the unique identifier of the consumable product whereby the unique identifier thereafter is linked or related to the sample or the source of the sample.

The term "consumable product" refers to a consumable product selected from sample containers, histology processing cassettes or components therefor and viewing supports, for example sample slides and especially microscope slides, and any other items which are employed in a histology process and which typically require a unique identifier. The term "consumable product" also includes a group of consumable products to be used for processing a single sample or part thereof comprising a sample container and one or more of each of a histology cassette and a sample slide.

The term a "group of consumable products" refers to a plurality of consumable products comprising a sample container and one or more of each of a histology cassette and a sample slide.

The term "pre-identified" as employed herein means applying, marking or otherwise labelling a consumable product with a unique identifier before the point of use, preferably at the point of manufacture where a plurality of consumable products have an identifier applied en bloc. The unique identifier is applied to the consumable products independently of the identification of the tissue sample with which the consumable products will be used. Advantageously, pre-identification thereby allows labelling of the consumable products to be carried out without any knowledge of the sample which is to be processed using the consumable product or its source.

The unique identifier of the uniquely identifiable consumable product according to the first or second aspect of the invention is suitably recorded in a database or information system, preferably a laboratory information system (LIS) as an electronic information record. The information record may be accessed and have further information added to it thereafter and such further information becomes associated with the unique identifier.

In a third aspect, the invention provides a product and information management system comprising i) a uniquely identifiable consumable product according to the first or second aspect of the invention for use in a histology or cellular pathology process for processing a biological sample from a source; and ii) a remote record comprising information unambiguously identified with the unique identifier of the consumable product.

Suitably, the remote record is linkable to a sample record comprising information about the said biological sample.

The product and information management system preferably further comprises i) at least one further uniquely identifiable consumable product, each further product comprising a unique identifier and ii) a further remote record comprising information unambiguously identified with that unique identifier of the consumable product wherein the remote record of any such further consumable product is linkable to the remote record of any other consumable product and to a sample record.

Preferably the information unambiguously identified with the unique identifier on the consumable product in the remote record is the unique identifier itself. The information record is stored in a database or information system and is accessible remotely. The information record may have sample information added to it after the consumable product has been manufactured and at the point of use of the consumable product. The sample information may be information relating to a sample from a patient or an archive sample and addition of this information creates a link between the sample and the unique identifier which has been previously applied to the consumable products.

Thus, at the time of manufacture of the consumable products and up to the point at which the consumable product is used, the consumable product has an identifier which is not linked to the source of the sample. However, at the point in time when the consumable product is used and the sample information is entered into the information record in the database or information system, the unique identifier and the consumable product(s) is then inked to or associated with the sample and the source of the sample.

The invention provides in a fourth aspect, a method of providing a consumable product which is uniquely linked with a biological sample to be processed in the consumable product which comprises:

i) Providing a consumable product comprising a unique identifier which is not linked to the biological sample;
  ii) Creating an information record, preferably in a remote system an information system, comprising information unambiguously identified with the unique identifier of the consumable product, preferably a record of the unique identifier;
  iii) Placing or associating the biological sample in, on or with the consumable product, for example a sample pot; and
  iv) Recording in the information record, information associated with or identifying the sample or the source of the sample, thereby creating a unique association between the sample and the unique identifier.

In a further aspect, the invention provides a plurality of uniquely identifiable consumable products or a plurality of groups of consumable products for use in a histology or cellular pathology process for processing different biological samples, each consumable product or group of consumable products comprising a unique identifier which is not linked to the source of the sample.

The invention, in another aspect, provides a method of producing a plurality of uniquely identifiable consumable products or a plurality of groups of consumable products for use in a histology or cellular pathology process for processing different biological samples, comprising providing a plurality of consumable products and applying to each consumable product or group of consumable products, a unique identifier which is not linked to the source of the sample.

The method suitably further comprises the step of using the pre-identified consumable product in a histology or cellular pathology process for processing a sample and forming a link between the identifier on the product and information relating to the source of the sample to be processed in the said product.

Suitably, the identifier on the consumable product and information relating to the source of the sample may be stored in a database or archive, optionally with additional data or information relating to the sample, its analysis, diagnosis relating to the sample and any other information of relevance to the sample or the subject or source of the sample.

By disconnecting the physical action of applying a unique identifier or labelling the consumable product from information relating to the sample or the identity or source of its origin, the method allows the consumable products to be identified with a unique identifier in a location which is different to the location at which the consumable product is used. Furthermore, the need for costly printing equipment for printing cassettes and for printing slides, integrating such printers into a laboratory information management system, printer servicing and downtime, printer-related consumables such as ink and training of technical staff may be avoided or reduced. Also avoiding the potential of breakdown of such marking machines and hence the laboratory becoming inoperable in such an event or investment in multiple marking machines to mitigate this potential.

Moreover, drawbacks associated with bar-codes and other forms of information printed at the point of use such as smudging or non-readability of the data.

The invention provides in a further aspect use of a consumable product according to the invention in the analysis or processing of a biological sample in a histology or cellular pathology process.

The invention also provides a method of uniquely identifying a biological sample in a consumable product comprising:

i) providing a consumable product according to the first or second aspect of the invention having a unique identifier;

ii) recording the unique identifier in an information record, preferably in a remotely accessible information system;

iii) creating a sample record relating to the biological sample;

iv) placing the biological sample into the said consumable product, v) associating the sample record with the information record thereby creating a link or association between the sample information and the unique identifier;

vi) subjecting the sample to a histology or cytology process.

Suitably the process is a histology process comprising contacting the sample with a processing solution comprising molten paraffin wax (or other embedding media) and cooling the sample in molten paraffin wax (or other embedding media) so the sample is embedded in solidified paraffin (or other embedding media) for further processing.

An example of a preferred method according to the invention comprises the steps:

taking a sample or specimen in a clinic and placing the sample in a pre-identified sample pot, for example a pre identified Cellstor pot, available from Cellpath, the pot having a pre-applied unique identifier which is stored in an information system;

Sending the pot to a laboratory for analysis;

Generating a request reference number in a laboratory information management system and labelling the pot and further pots as required with the request reference for example H21/12345/PID (Pot)

Embedding: the request number is scanned to provide the unique identifier. The sample is described, grossed and dissected. One or more histology cassette/s are scanned to provide a link to a pot and a case reference number for example:

H21/12345/PID(pot No)/PID(Cassette No)

H21/12345/PID(pot No)/PID(Cassette No)

H21/12345/PID(pot No)/PID(Cassette No) etc'

Cassettes are processed, embedded

Microtomy: The request number is scanned to provide the case number. Cassette (Block) PID #01 is scanned, A PID (slide) is taken and scanned associating it with Cassette (block)PID #01, PID(pot), Case number, for example H21/12345/PID(pot)/PID(Cassette)/PID (slide)

H21/12345/PID(pot)/PID(Cassette)/PID (slide)

H21/12345/PID(pot)/PID(Cassette)/PID (slide) etc'

Slide Staining, Slides may become separated at this stage for different staining processes.

Slides are then coverslipped

Quality control: Request form is scanned, Pots, Blocks and slides in racks are placed under a vision system which identifies the relationship between case number and Pots, Blocks and slides, system would guide the user to each item. Case is then sent to diagnoses.

Once Diagnoses is complete pot is disposed of, report form, blocks and slides are archived individually?

Another preferred method comprises the following steps:

A sample or specimen is taken in Clinic and put into a pre identified pot

Specimen Sent to Lab

Specimen booked in and request number generated. Example H21/12345.Cellstor pot/s are Scanned to associate with case number/request number for example: H21/12345/PID(pot), H21/12345/PID(pot) H21/12345/PID(pot) etc'

Embedding: the request number is scanned to bring up case number. Specimen is described, grossed and dissected. X number of PID Cassette/s are scanned to link with pot and case number.

H21/12345/PID(pot)/PID(Cassette)

H21/12345/PID(pot)/PID(Cassette)

H21/12345/PID(pot)/PID(Cassette) etc'

Cassettes are processed and embedded

Microtomy: the request number is scanned to bring up case number. Cassette (Block) PID #01 is scanned, A PID (slide) is taken and scanned associating it with Cassette (block)PID #01, PID(pot), Case number, for example:

H21/12345/PID(pot)/PID(Cassette)/PID (slide)

H21/12345/PID(pot)/PID(Cassette)/PID (slide)

H21/12345/PID(pot)/PID(Cassette)/PID (slide) etc'

Slide Staining, Slides may become separated at this stage for different staining processes.

Slides are then coverslipped.

Quality Control: the request form is scanned, Pots, Blocks and slides in racks are placed under a vision system. An auto mated pick and place robot in conjunction with the vision system would collate Pots, Blocks and slides, before the case is sent to diagnoses.

Once Diagnoses is complete pot is disposed of, report form, blocks and slides are archived individually.

The consumable product is suitably manufactured and has the unique identifier applied to it at a manufacturing site. The sample is placed in the consumable product at a second location, for example a clinic. The consumable product comprising the sample Suitably, the method according to the invention comprises the additional step, prior to step ii), providing a sample container containing a biological sample, the container having a pre-identified unique identifier removing the sample from the container for placement in the cassette in step ii) and linking, cross-checking or verifying the unique identifier on the container and the cassette or other cellular pathology consumable.

Suitably, the method according to the invention comprises the additional step after step ii) of the method according to the invention, of subjecting the embedded sample and solidified paraffin wax to a microtomy process to produce a sample section and placing the sample section on a viewing support, for example a microscope slide, which comprises a unique identifier applied to the support prior to its use or knowledge of the sample with which it is to be used, preferably at the point of manufacture, and subjecting the sample to analysis and linking, cross-checking or verifying the unique identifier on the viewing support with that on the cassette and/or sample container.

By providing consumable products which are pre-labelled with a unique identifier, monitoring or verification of sample identity may be carried out automatically at any point in the process, providing automated verification of the sample at any point in the process and its source. Where the sample is transferred from a sample container to a processing cassette or from a processing cassette to a viewing support, verification of the transfer to ensure continuity and traceability may be carried out by automated reading of the pre-applied unique identifier, for example by an automated reader or imaging system.

For example, cassettes or sample wax blocks comprising a cassette bearing the pre-identified identifier may be verified electronically against viewing supports request forms or other paperwork generated in the process, sample pots or containers via automated readers or imaging system.

In a preferred embodiment, a laboratory information management system (LIMS) is employed to manage all information and data relating to the method of the invention including tracking of samples and data relating to any aspect of the method for example data relating to samples, experiments, process steps, laboratory workflow, instruments, the number of consumable products required for any given sample processing, unique identifiers of consumable products according to the invention and associations of any such data. In a preferred embodiment, the sample is taken from its source or from storage and placed in a container having a unique identifier, the sample is subsequently transferred to a cassette having another unique identifier and after further processing transferred to a further consumable product, for example a microscope slide, with another unique identifier. The LIMS system suitably keeps track of the sample through these steps and records each unique identifier for the various consumable products at each stage of the process. In this way the LIMS system provides a verifiable audit trail to ensure the sample under analysis is unequivocally identifiable with its source.

The method of the invention further comprises an automated laboratory information management system which receives input selected from any information relating to the sample and the unique identifier of any consumable product used in the method, preferably the unique identifiers of each of a cassette, and optionally one or more and preferably both of a sample container and a viewing support, for example a microscope slide.

The laboratory information management system may be known or may be a bespoke product devised for use with a method according to the invention. The LIMS system may also manage ancillary activities associated with the method or the laboratory in which the method is carried out including instrument or equipment maintenance, samples, information relating to scientific staff, technical staff and administrative staff. The information may relate to clinical and/or non-clinical matters.

Images may be captured of the sample in the solidified paraffin wax and of the sample section on the viewing support to verify the shape, outline or other identifying characteristic of the sample to provide additional verification that the sample on the viewing support derives from the sample in the solidified paraffin wax.

The sample container, cassette and viewing support and any other information, or tracking records may be collated for onward processing or analysis, for example by a pathologist, or for archiving.

The invention provides any known cassettes having a pre-marked identified unique identifier.

Cassettes for processing biological tissues typically comprise an open-topped box with a perforated bottom wall. The box may have a perforated top cover which is moveable relative to the box such as a hinged lid or removable. The cassette typically has three vertical side walls and the fourth, side wall, on the front side of the cassette is typically sloping and includes an area for applying or marking a unique identifier. Processing cassettes may define one cavity and process one sample at a time or may have multiple cavities to allow processing of multiple samples. Processing cassettes are typically constructed of plastics material and the perforations are made in the plastic material which forms the bottom wall and, where employed, the plastics material forming the lid. In other embodiments, a fine mesh may be employed in the base and or lid to allow passage of fluids therethrough while the sample is being prepared or embedded. The perforations of the cassette are typically from 0.1 to 3, for example 0.3 to 2 mm in diameter. Known processing cassettes are described for example in GB 1230913 and U.S. Pat. No. 3,674,396.

The cassette may be of any size, whether a "standard size" or a non-standard size. "standard size" histology processing cassettes typically have internal dimensions of 28 to 32 mm×25 to 28 mm×5 to 6 mm, typically a maximum size of 30 to 31 mm by 25 to 26 mm. Minor variations in size may occur, dependent for example upon the wall thickness of the box. A "standard size" cassette as is required to fit in other apparatus, for example fit standard specimen holders, known as chucks, of microtomes.

Certain samples, for example prostate samples are larger than the standard size cassette and require a larger cassette. Larger cassettes typically have an area four times that of a standard cassette and a depth of around twice that of a standard cassette, for example dimensions of around 50 to 55 by 65 or 70 to 75 or 80 by 12 to 17 mm are conventionally employed for use in processing larger samples. The ratio of the length, to the width and to the depth of a larger cassette is therefore approximately the same as that of a standard sized cassette. Larger cassettes having a width of 50 to 55 and a length of 65 or 70 to 75 or 80 and a depth of 6 to 8 mm are known from EP 2951672A in which the ratio of the length to the width is approximately from 7 to 8:5, the ratio of the width to the depth is from 6 to 9:1 and the ratio of the length to the depth is from approximately 9 to 12:1. In a preferred embodiment, the length, width and depth of the cassette are suitably 75, 52.5 and 7 or 8 mm respectively.

Cassettes and assemblies of the type described in European patent application EP21202030.9 may be pre-identified in accordance with the present invention. In one embodiment the invention provides a histology processing assembly comprising i) a cassette frame comprising a recess for irreversibly receiving a sample carrier; and ii) a sample carrier comprising a compartment for holding a biological sample, the sample carrier being adapted for irreversible engagement with the said cassette frame;

wherein the cassette frame and/or the sample carrier comprises a unique identifier applied thereto prior to use of the assembly, preferably during manufacture of the assembly.

Suitably, the consumable comprises a unique identifier, for example an alphanumeric number. The unique identifier may be physical, chemical or electronic and printed, embedded, embodied within or otherwise applied to the consumable. Preferably, the unique identifier is embedded in a data matrix on or in the consumable, for example a 2D data matrix. In addition to enabling identification of the consumable, application of the unique identifier in the manufacturing process rather than at the point of use enables identifiers to be employed that may not be readily usable if applied at the point of use, for example a 2D data matrix and RFID chip.

At present, a hospital or clinic applies its own unique identifier to consumables at the point of use using printers. The manufacturer of the printers will supply a wide range of customers, for example clinics and hospitals, with their products and each medical establishment will be free to apply whatever unique identifier it chooses. Each medical establishment individually or within a group may apply that identifier and they may be unique within that establishment or group of establishments. However, there is no link or certainty that identifiers applied in one establishment are, in fact, different to identifiers applied in independent, unrelated establishments, especially if those independent clinics and hospitals use the same printing equipment.

By applying a unique identifier to the consumables at the point of manufacture, such consumables may be supplied to unrelated medical establishments whilst ensuring that the identifiers are unique across all establishments, rather than unique to a single medical establishment or group.

The invention provides a method of ensuring histology consumable products or groups of consumable products supplied to at least two medical establishments which are independent of each other each comprise an identifier which is unique to that consumable product or group of consumable products and different to the identifier applied to the other consumable products or groups of consumable products supplied to the at least two medical establishments, the method comprising applying a unique identifier to each consumable product or group of consumable products prior to the point of use of the consumable product or group of consumable products preferably during the process of manufacture of the consumable product or group of consumable products and supplying the consumable products or groups of consumable products to the at least two medical establishments for use in a histology process or cell pathology process.

Application of the unique identifier prior to use and preferably during manufacture allows the identifier to be unique to that consumable or group of consumables irrespective of the particular clinic or hospital to which a batch of consumables is sent.

A database may be employed to keep a record of the unique identifier and the medical establishment to which it is supplied and, optionally other data, for example dates, order or batch numbers and the like. The database may be connected to or connectable with a record system in the medical establishment to which the consumables are supplied.

Figure 1:
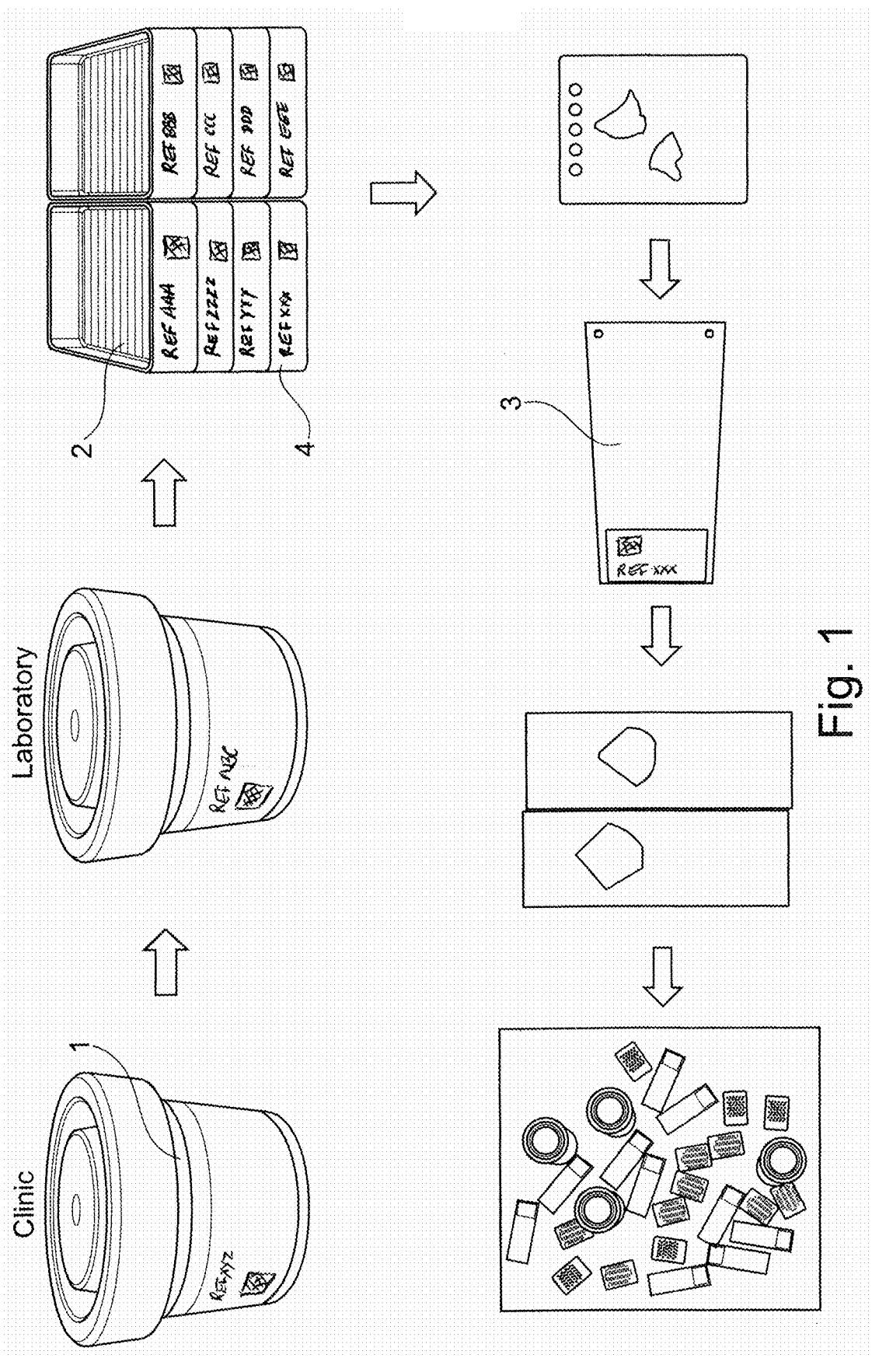
FIG. 1 shows a process flow diagram representing a method according to the invention and showing consumable products having pre-identified identifiers.

The sample container (1), histology processing cassettes (2) and microscope slide for supporting a sample for viewing (3) have been manufactured with unique identifiers (4).

The identifier for the cassettes is different to that on the container so that multiple specimens from one sample in the container may be taken and placed in a number of cassettes with each cassette being uniquely identifiable from the others. The slide (3) may also have its own unique identifier such that multiple slices from the embedded sample in the cassette may be distinguished. The unique identifiers of the container, the cassettes and the microscope slides are suitably recorded and linked as appropriate in a data management system.

The sample is taken in a clinic or recovered from an archive or other source and is placed in a pre-identified container. The container is scanned to link to patient information to the unique identifier on the container. A request form may be produced also linking the unique identifier and the patient information or a record relating to a patient. The container with the sample and, if required a request form is then sent to a laboratory for processing.

On arrival at the laboratory, the sample is suitably logged in the information management system and a request for processing of the sample is generated on the laboratory information management system, generating a request number. The request number is the prime identifier for the patient or source of the sample. The container is scanned and a link to the request number is created.

The sample in the container and the request are then dispatched for sample processing where the sample is placed in a pre-identified cassette having any unique identifier. The cassette is scanned and linked to the request number. The sample is then processed, for example it is described, grossed and dissected to produce sectional slices.

A microscope slide for supporting and viewing the sample having a unique identifier is selected and scanned and linked to the request number. The sample is placed on the support and subjected to processing, for example staining. Further sections of the same sample may be subjected to processing and multiple supports, each with their own unique identifier may be produced.

Once the processing is complete, the sample is suitably subject to quality control where the request form, containers, cassettes and microscope slides, for example held in racks, are observed suitably in an automated manner, for example using an imaging or vision system, to identify the relationship between the request number, containers, cassettes and viewing supports, The user may then select the appropriately linked consumable products, safe in the knowledge that the samples all derive from one source. The selection may be carried out with an automated pick and place robot in conjunction with a vision system. The selected items may then be dispatched for diagnosis.

Figure 2:
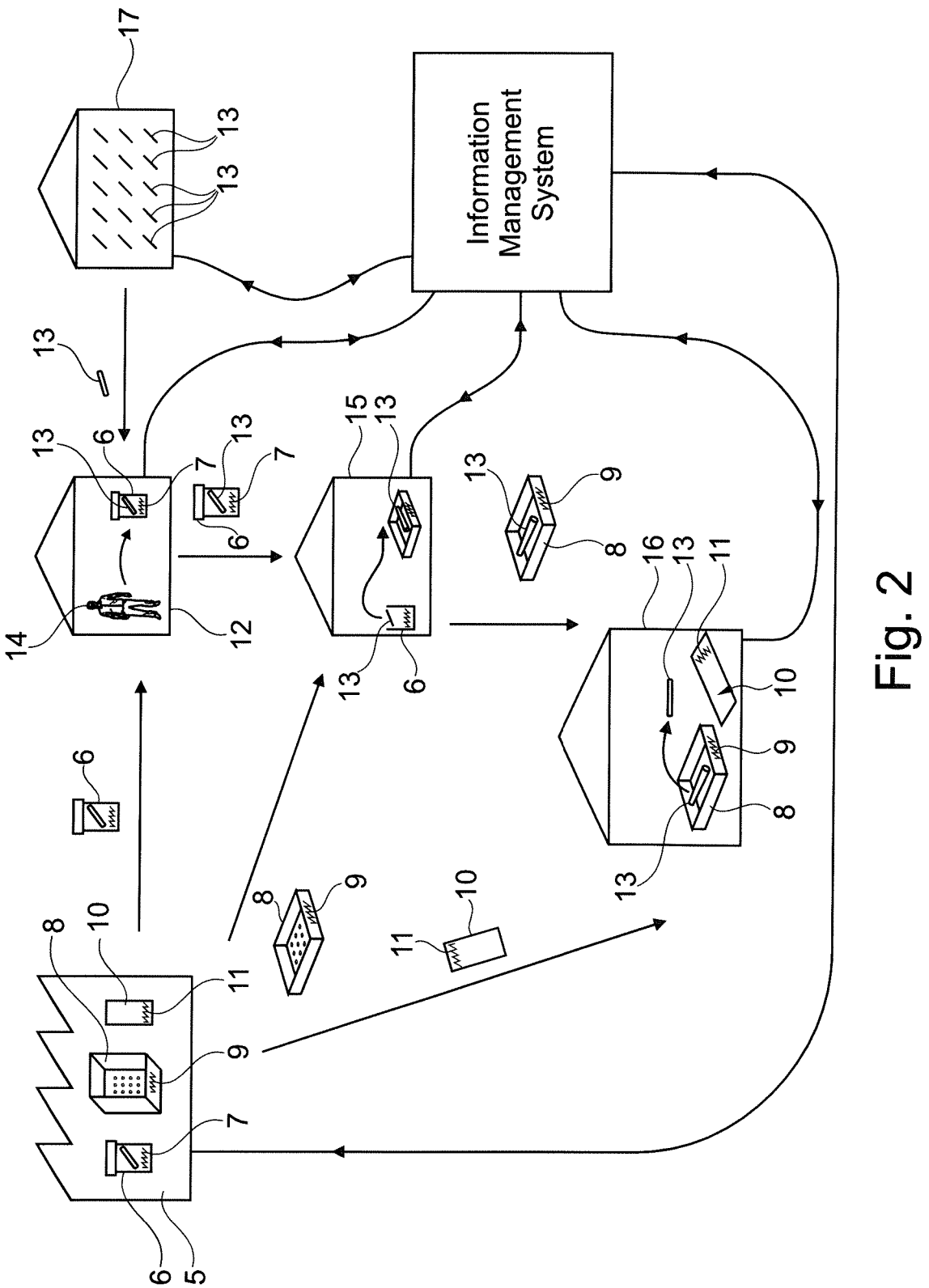
FIG. 2 shows a schematic representation of a method according to the invention.

FIG. 2 shows a manufacturing location (5) at which one or more consumable products for example sample container (6), histology cassette (8) and microscope slide (10) may be manufactured and have applied to each unit produced a unique identifier (7, 9, 11).

Different consumable products may be manufactured in different locations or in the same location as other consumable products. Sample containers (6) having their unique identifier (7) are supplied to medical establishment for example a clinic (12) where a sample to be analysed (13) is taken from subject or patient (14) and placed in a sample container (6) with a unique identifier (7). Alternatively, the sample (13) may be obtained from a stored location or archive (17) which may contain a multitude of samples (13). For each sample, information relating to the sample (13) is linked to information relating to the origin of the sample (13), whether the sample is acquired directly from a person (14) or from storage or archive (17).

Information relating to the sample, the source or subject from which the sample is obtained and the unique identifier (7) on the container (6) is recorded to establish a link between the source, the sample and the sample container. The information may be managed by an information management system or a laboratory information management system and is suitably computerised and/or automated. Any other information of value or interest may be recorded and monitored by the information management system.

The sample (13) in sample container (6) may then be transported to a different location (15) for processing or kept in the same location for processing. The sample (13) is removed from the sample container (6) and placed in a cassette (8) which also has its own unique identifier (9). The cassettes (8) have suitably been supplied directly from manufacturing location (5) to the clinic or medical establishment (15) and are pre-identified with unique identifier (9).

As the sample (13) is moved from container (6) to cassette (8), the unique identifier (9) is recorded with unique identifier (7) in the information management system in order to maintain an audit trail for the sample. The sample may then be subjected to the desired procedures, for example histological preparation by embedding in paraffin wax. The embedded sample may then be transported to a different location (16) for subsequent processing or kept in the same location for further processing. Such further processing may include microtomy to provide a thin cross-sectional sliver of the sample (13). The cross-sectional sliver of sample may then be applied to a further consumable product such as a microscope slide (10) having its own unique identifier (11). The unique identifier (11) is recorded together with unique identifiers (7, 9) to provide a further uniquely identified trail for the sample and its source and the applicable processes, analysis, information and results arising from those procedures. The microscope slides (10) are suitably supplied directly from the manufacturing location (5) which may the same or different to the manufacturing location for the sample container (5) or cassette (5).

The information management system may be linked to one or more of the manufacturing location (5) or locations if more than one, the clinic (12) and other locations (15), (16) for downstream processing of the sample. Information flow may be one-way or preferably two-way between the information system and any one or more the locations to which it is connected. This facilitates remote sample tracking and management.

There is no need for printing, applying identifying marks or labelling any of the sample container, cassette or histology slide in any of the clinics, laboratories or other medical establishments. All of the consumable products have a unique identifier applied to them at the time of manufacture. This enables large-scale processing of this activity using dedicated equipment and thereby avoids capital expenditure at each clinic or medical establishment, avoids loss of technician, administrative or medic time, improved throughput, reduced physical footprint as there is no need to set aside space for printing the consumable product at the point of use.

The invention claimed is:

1. A product and information management system comprising:

i) a uniquely identifiable product for use in a histology or cellular pathology process for processing a biological sample, wherein the product comprises a unique identifier which is not linked to the sample or a source of the sample; and ii) a remote record comprising information unambiguously identified with the unique identifier of the product and linkable to a sample record comprising information about the biological sample, the uniquely identifiable product comprising a unique identifier applied to the product at a point of manufacture which is not linked to the sample or the source of the sample, and wherein the product is selected from a histology processing cassette, a sample container, a sample slide, and a group of products comprising a sample container and one or more of each of a sample slide and a histology processing cassette.

2. The product and information management system according to claim 1 wherein the remote record is linked to a sample record comprising information about the source of the said biological sample.

3. The product and information management system according to claim 1 further comprising i) at least one further uniquely identifiable product, each further product comprising a unique identifier and ii) a further remote record comprising information unambiguously identified with that unique identifier of the product wherein the remote record of any such further product is linkable to the remote record of any other product and to a sample record.

4. The product and information management system according to claim 1, wherein the unique identifier is embedded in a data matrix on or in the product.

5. The product and information management system according to claim 1, wherein the unique identifier is selected from a 2D data matrix and an RFID chip.

6. A method of ensuring a first product or groups of products supplied to a first medical establishment and a second product or groups of products supplied to a second medical establishment, which first and second medical establishments are independent of each other, comprise an identifier which is unique to that first product or groups of products supplied to the first medical establishment and different to the identifier applied to the second product or groups of products supplied to the second medical establishment, the method comprising:

applying at a point of manufacture of the first product or groups of products a first unique identifier to the first product or groups of products destined for the first medical establishment and applying at a point of manufacture of the second product a second unique identifier which is different to the first unique identifier to the second product or groups of products destined for the second medical establishment; and supplying the first and second product or groups of products to the first and second medical establishments, respectively, for use in a histology process or cell pathology process.

7. A method of uniquely identifying a biological sample in a histology cassette comprising:

i) providing a uniquely identifiable histology processing cassette for use in a histology or cellular pathology process for processing a biological sample from a source, the processing cassette having a unique identifier which is applied at a point of manufacture and is not linked to the sample or the source of the sample and the processing cassette being adapted to be received in apparatus for processing a biological sample;

ii) recording the unique identifier in an information record;

iii) recording sample information relating to the biological sample in the information record thereby creating a link or association between the sample information and the unique identifier; and iv) placing the biological sample into the histology processing cassette and treating the sample by contacting it with a processing solution comprising molten paraffin wax and cooling the sample in molten paraffin wax so the sample is embedded in solidified paraffin wax for further processing. 5

8. The method according to claim 7 comprising providing a sample container containing a biological sample, the container having a pre-identified unique identifier, removing the sample from the container for placement in a cassette and linking, cross-checking or verifying the unique identifier on the container and the cassette. 10

9. The method according to claim 7 comprising subjecting the embedded sample and solidified paraffin wax to a microtomy process to produce a sample section and placing the sample section on a viewing support which comprises a pre-identified unique identifier and subjecting the sample to analysis and linking, cross-checking or verifying the unique identifier on the viewing support with that on a cassette and/or sample container. 20 15

\* \* \* \* \*